(12) United States Patent
Taamazyan et al.

(10) Patent No.: US 12,142,025 B2
(45) Date of Patent: Nov. 12, 2024

(54) POLARIZATION EVENT CAMERAS

(71) Applicant: INTRINSIC INNOVATION LLC, Mountain View, CA (US)

(72) Inventors: Vage Taamazyan, Moscow (RU); Agastya Kalra, Nepean (CA); Achuta Kadambi, Los Altos Hills, CA (US); Kartik Venkataraman, San Jose, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 375 days.

(21) Appl. No.: 17/528,132

(22) Filed: Nov. 16, 2021

(65) Prior Publication Data
US 2023/0154143 A1   May 18, 2023

(51) Int. Cl.
*G06V 10/75*   (2022.01)
*G01J 4/00*   (2006.01)
*G06V 10/50*   (2022.01)

(52) U.S. Cl.
CPC ............. *G06V 10/751* (2022.01); *G01J 4/00* (2013.01); *G06V 10/507* (2022.01)

(58) Field of Classification Search
CPC .... G06V 10/751; G06V 10/507; G06V 20/56; G06V 20/70; G06V 10/14; G01J 4/00
USPC .......................................................... 348/254
See application file for complete search history.

(56) References Cited

U.S. PATENT DOCUMENTS

| 10,924,689 | B1 | 2/2021 | Duckett, III et al. | |
| 2013/0293871 | A1* | 11/2013 | Gruev | G01J 3/0224 356/73 |
| 2015/0367975 | A1* | 12/2015 | Schiavina | B29C 66/8167 53/201 |
| 2020/0149966 | A1* | 5/2020 | Sparks | G01J 3/0205 |
| 2020/0185436 | A1 | 6/2020 | Mitani et al. | |
| 2021/0136288 | A1 | 5/2021 | Stec | |

FOREIGN PATENT DOCUMENTS

| WO | WO 2021/105271 | 6/2021 | |
| WO | WO-2021105271 A1 * | 6/2021 | ................ G01J 4/04 |
| WO | WO 2021/172284 | 9/2021 | |

OTHER PUBLICATIONS

International Search Report and Written Opinion PCT/US2022/050083, dated Mar. 24, 2023, 9 pages.
Gallego, Guillermo, et al. "Event-based Vision: A Survey." IEEE Transactions on Pattern Analysis & Machine Intelligence 01 (2020): 1-1, 30 pages.

(Continued)

*Primary Examiner* — Usman A Khan
(74) *Attorney, Agent, or Firm* — Fish & Richardson P.C.

(57) ABSTRACT

A polarized event camera system includes: an event camera having a field of view centered around an optical axis, the event camera including an image sensor including a plurality of pixels, each pixel of the event camera operating independently and asynchronously and being configured to generate change events based on changes in intensity of light received by the pixel; and a rotatable linear polarizer aligned with the optical axis of the event camera, the rotatable linear polarizer having a polarization axis, the polarization axis of the rotatable linear polarizer being rotatable about the optical axis of the event camera.

16 Claims, 7 Drawing Sheets

(56) References Cited

OTHER PUBLICATIONS

Jayasuriya, Suren. Plenoptic Imaging and Vision Using Angle Sensitive Pixels. Cornell University, 2017, 182 pages.
Lichtsteiner, Patrick, Christoph Posch, and Tobi Delbruck. "A 128×128 120 dB 15 μs latency asynchronous temporal contrast vision sensor." IEEE journal of solid-state circuits 43.2 (2008): 566-576.
Tanaka, Kenichiro, Yasuhiro Mukaigawa, and Achuta Kadambi. "Polarized Non-Line-of-Sight Imaging." Proceedings of the IEEE/CVF Conference on Computer Vision and Pattern Recognition. 2020, 10 pages.
Teng, Jiajie, et al. "Single-shot 3D tracking based on polarization multiplexed Fourier-phase camera." Photonics Research 9.10 (2021): 1924-1930.
Yang, Luwei, et al. "Polarimetric Dense Monocular SLAM." Proceedings of the IEEE conference on computer vision and pattern recognition. 2018, 10 pages.
Zou, Shihao, et al. "Human Pose and Shape Estimation from Single Polarization Images." arXiv preprint arXiv:2108.06834 (2021), 17 pages.
International Preliminary Report on Patentability PCT/US2022/050083, dated May 30, 2024, 6 pages.

\* cited by examiner

POLARIZATION EVENT CAMERAS

FIELD

Aspects of embodiments of the present disclosure relate to techniques in digital imaging, including event cameras with polarizer filters.

BACKGROUND

A conventional digital camera generally captures image frames (e.g., at a frame rate such as 30 frames per second) using an image sensor, where each frame includes an array of pixel values, each pixel value representing the total amount of light received by the corresponding pixel of the image sensor over the course of an exposure interval of a frame.

In contrast, an event camera is a type of image capturing device that captures the change of brightness detected at each pixel rather than an absolute brightness value. Each pixel of an image sensor of an event camera operates independently and asynchronously. When a pixel of an event camera detects a change in the intensity of light falling on the pixel, the event camera generates an output event, which may encode a location of the pixel (e.g., row and column) within the image sensor and a representation of the change (e.g., increase or decrease in brightness and, in some cases, magnitude of the change) which is transmitted to a controller (e.g., a host comping system). Event cameras have extremely high dynamic range and very fine temporal resolution, in some cases reaching microseconds.

A polarizer or polarizing filter is an optical filter that passes light waves having an angle of polarization that is aligned with the axis of the linear polarizer and that blocks light having an angle of polarization that is not aligned with the axis of the linear polarizer in accordance with a difference between the angle of polarization of the light $\varphi$ and the axis of the polarizer $\varphi_{pol}$.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure relate to a polarization event camera, including an event camera having a polarizer filter (or polarizing filter) in its optical path or along its optical axis. In some embodiments the polarizer filter is a rotatable linear polarizer. Some aspects of embodiments relate to methods for processing events detected by the event camera to calculate or estimate the angle of linear polarization of light detected by the event camera based on the angle of the rotatable linear polarizer at the time of the event generated by the event camera.

According to one embodiment of the present disclosure, a polarized event camera system includes: an event camera having a field of view centered around an optical axis, the event camera including an image sensor including a plurality of pixels, each pixel of the event camera operating independently and asynchronously and being configured to generate change events based on changes in intensity of light received by the pixel; and a rotatable linear polarizer aligned with the optical axis of the event camera, the rotatable linear polarizer having a polarization axis, the polarization axis of the rotatable linear polarizer being rotatable about the optical axis of the event camera.

The polarized event camera system of claim 1 may further include: a controller including a processing circuit and memory, the memory storing instructions that, when executed by the processing circuit, cause the processing circuit to: receive a first change event from the event camera, the first change event representing a first detected change in intensity of light received at a pixel of the event camera, and the first change event corresponding to the polarization axis of the rotatable linear polarizer being at a first angle; receive a second change event from the event camera, the second change event representing a second detected change in the intensity of the light received at the pixel of the event camera, and the second change event corresponding to the polarization axis of the rotatable linear polarizer being at a second angle different from the first angle; and estimate an angle of linear polarization of the light received at the pixel of the event camera based on the first change event and the second change event.

The estimate of the angle of linear polarization of the light received at the pixel of the event camera may be computed based on: detecting an angle of the polarization axis of the rotatable linear polarizer at which a magnitude of a change in the intensity of the light received at the pixel of the event camera is at a minimum.

The first change event may include a first timestamp and the second change event may include a second timestamp, the second timestamp being later than the first timestamp, and the minimum of the change in the intensity of the light received at the pixel of the event camera may be computed by: determining that the first change event identifies an increase in the intensity of the light received at the pixel and that the second change event identifies a decrease in the intensity of the light received at the pixel; and estimating the angle of linear polarization of the light as an angle between the first angle of the polarization axis of the rotatable linear polarizer and the second angle of the polarization axis of the rotatable linear polarizer.

The angle between the first angle of the polarization axis of the rotatable linear polarizer and the second angle of the polarization axis of the rotatable linear polarizer may be estimated by linearly interpolating the first angle and the second angle in accordance with a magnitude of the first change event and a magnitude of the second change event.

The first angle of the polarization axis of the rotatable linear polarizer and the second angle of the polarization axis of the rotatable linear polarizer may differ by an angle other than a multiple of 180°, and the instructions to estimate the angle of linear polarization may include instructions to compute an estimated angle of linear polarization $\hat{\varphi}$ in accordance with solving a system of equations:

$$dI_1 = \rho I \sin(2(\varphi - \varphi_{pol,1})) d\varphi_{pol,1}$$

$$dI_2 = \rho I \sin(2(\varphi - \varphi_{pol,2})) d\varphi_{pol,2}$$

for the angle of linear polarization $\varphi$, where $dI_1$ is the first detected change in intensity of light, $dI_2$ is the second detected change in intensity of light, $\varphi_{pol,1}$ is the first angle of the polarization axis of the rotatable linear polarizer corresponding to the first change event, and $\varphi_{pol,2}$ is the second angle of the polarization axis of the rotatable linear polarizer corresponding to the second change event.

The first angle of the polarization axis of the rotatable linear polarizer and the second angle of the polarization axis of the rotatable linear polarizer may differ by 45°, and the instructions to estimate the angle of linear polarization may include instructions to compute an estimated angle of linear polarization $\hat{\varphi}$ in accordance with:

$$\hat{\varphi} = \frac{1}{2}\arctan\left(\frac{I_0}{I_{45}}\right)$$

where $I_0$ is a magnitude of the first change event at the first angle of the polarization axis of the rotatable linear polarizer and $I_{45}$ is a magnitude of the second change event at the second angle of the polarization axis of the rotatable linear polarizer.

The memory may further store instructions that, when executed by the processing circuit, cause the processing circuit to compute an angle of linear polarization (AOLP) map representing an estimated angle of linear polarization detected at each pixel of the image sensor of the event camera.

The rotatable linear polarizer may include an electronically controlled mechanically rotatable linear polarizer.

According to one embodiment of the present disclosure, a method for estimating a polarization state of light includes: receiving a first change event from an event camera having a field of view centered around an optical axis, the event camera including an image sensor including a plurality of pixels, each pixel of the event camera operating independently and asynchronously and being configured to generate change events based on changes in intensity of light received by the pixel, the first change event representing a first detected change in intensity of light received at a pixel of the event camera, and the first change event corresponding to a polarization axis of a rotatable linear polarizer being at a first angle, the rotatable linear polarizer being aligned with the optical axis of the event camera and having a polarization axis rotatable about the optical axis of the event camera; receiving a second change event from the event camera, the second change event representing a second detected change in the intensity of the light received at the pixel of the event camera, and the second change event corresponding to the polarization axis of the rotatable linear polarizer being at a second angle different from the first angle; and estimating an angle of linear polarization of the light received at the pixel of the event camera based on the first change event and the second change event.

The estimating the angle of linear polarization of the light received at the pixel of the event camera may include: detecting an angle of the polarization axis of the rotatable linear polarizer at which a magnitude of a change in the intensity of the light received at the pixel of the event camera is at a minimum.

The first change event may include a first timestamp and the second change event includes a second timestamp, the second timestamp being later than the first timestamp, and the minimum of the change in the intensity of the light received at the pixel of the event camera may be computed by: determining that the first change event identifies an increase in the intensity of the light received at the pixel and that the second change event identifies a decrease in the intensity of the light received at the pixel; and estimating the angle of linear polarization of the light as an angle between the first angle of the polarization axis of the rotatable linear polarizer and the second angle of the polarization axis of the rotatable linear polarizer.

The angle between the first angle of the polarization axis of the rotatable linear polarizer and the second angle of the polarization axis of the rotatable linear polarizer may be estimated by linearly interpolating the first angle and the second angle in accordance with a magnitude of the first change event and a magnitude of the second change event.

The first angle of the polarization axis of the rotatable linear polarizer and the second angle of the polarization axis of the rotatable linear polarizer may differ by an angle other than a multiple of 180°, and the estimating the angle of linear polarization may include computing an estimated angle of linear polarization $\hat{\varphi}$ in accordance with solving a system of equations:

$$dI_1 = \rho I \sin(2(\varphi - \varphi_{pol,1}))d\varphi_{pol,1}$$

$$dI_2 = \rho I \sin(2(\varphi - \varphi_{pol,2}))d\varphi_{pol,2}$$

for the angle of linear polarization $\varphi$, where $dI_1$ is the first detected change in intensity of light, $dI_2$ is the second detected change in intensity of light, $\varphi_{pol,1}$ is the first angle of the polarization axis of the rotatable linear polarizer corresponding to the first change event, and $\varphi_{pol,2}$ is the second angle of the polarization axis of the rotatable linear polarizer corresponding to the second change event.

The first angle of the polarization axis of the rotatable linear polarizer and the second angle of the polarization axis of the rotatable linear polarizer may differ by 45°, and the estimating the angle of linear polarization may include computing an estimated angle of linear polarization $\hat{\varphi}$ in accordance with:

$$\hat{\varphi} = \frac{1}{2}\arctan\left(\frac{I_0}{I_{45}}\right)$$

where $I_0$ is a magnitude of the first change event at the first angle of the polarization axis of the rotatable linear polarizer and $I_{45}$ is a magnitude of the second change event at the second angle of the polarization axis of the rotatable linear polarizer.

The method may further include computing an angle of linear polarization (AOLP) map representing an estimated angle of linear polarization detected at each pixel of the image sensor of the event camera.

The rotatable linear polarizer may include an electronically controlled mechanically rotatable linear polarizer.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1A:
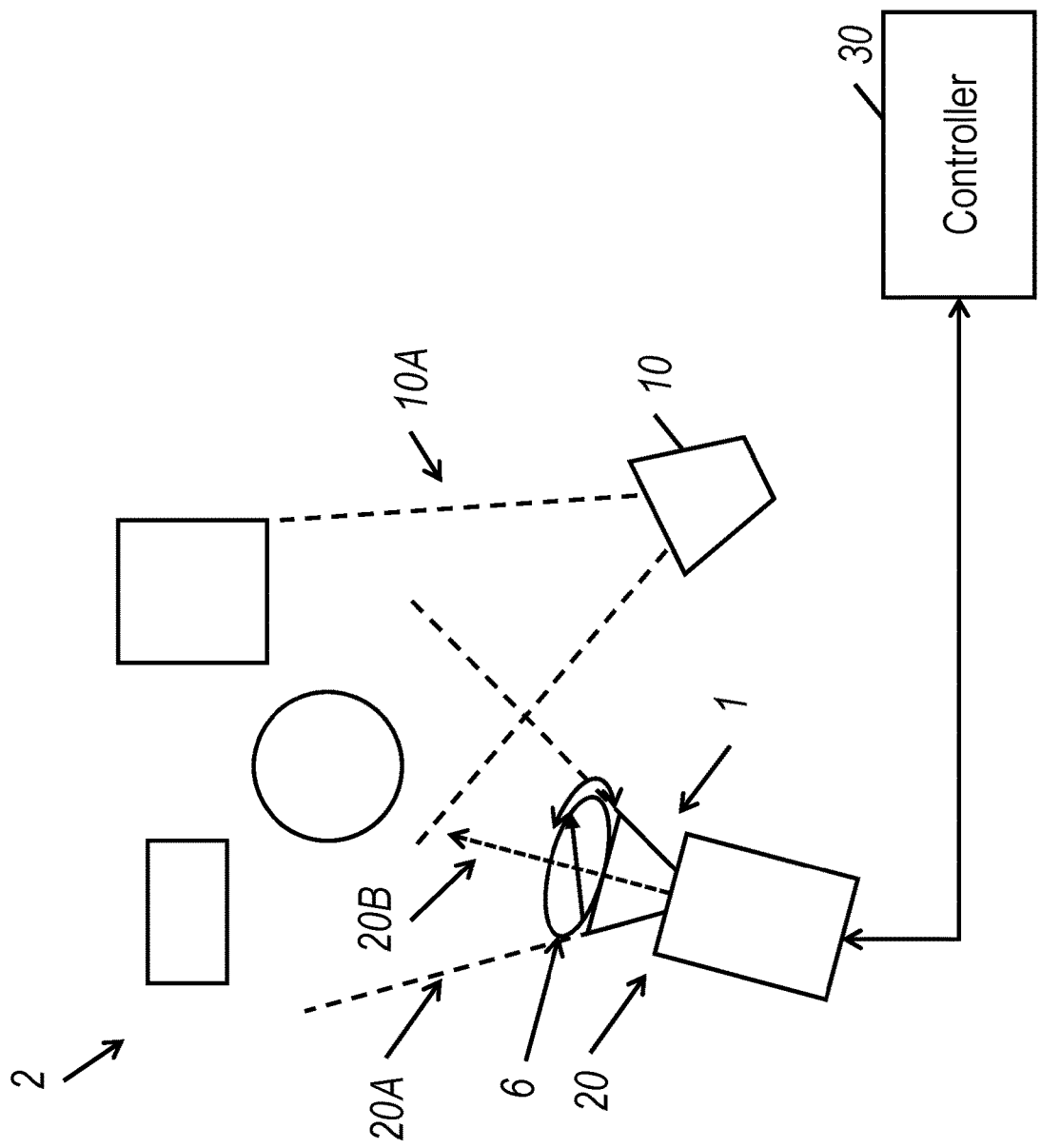
FIG. 1A is a block diagram of a system including an event camera with a rotatable linear polarizer (or a "polarization event camera") according to one embodiment of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein.

Conventional digital camera systems generally capture a relatively small portion of the plenoptic function. For example, conventional color video cameras typically capture images at a fixed frame rate (e.g., 30 or 60 frames per second) with three channels of color (e.g., separate red, green, and blue channels in accordance with a color filter such as a Bayer filter). While comparative computer vision or machine vision systems are able to use conventional camera systems to perform some vision tasks, such as semantic segmentation of particular types of well-behaved scenes, many common vision tasks that are challenging for such comparative systems. For example, many machine vision systems struggle with detecting surfaces of transparent objects, reflective objects, and matte black objects. Transparent objects lack texture (e.g., surface color information, such as in "texture mapping" as the term is used in the field of computer graphics), adopting instead the texture or appearance of the scene behind those transparent objects (e.g., the background of the scene visible through the transparent objects). Likewise, very reflective objects may adopt the texture or appearance of the objects they reflect. Reflective objects also frequently exhibit viewpoint-dependent and lighting-dependent specular highlights, which may cause the object to look different based on the positions of the light sources and the viewing angle on the object, and which may also saturate the digital camera at the locations of the highlights. Matte black objects may be difficult to detect due to the relative absence of surface texture that is detectable by conventional digital cameras.

One approach to detecting such optically challenging objects relates to the use of polarization cameras, which are configured to detect the angle of polarization of light received from a scene, thereby collecting information from portions of the plenoptic function that are not captured by conventional camera systems. Some examples of techniques for performing instance segmentation and other computer vision tasks making use of information regarding the angle of linear polarization of light are described in, for example: U.S. patent application Ser. No. 17/266,054, titled "Systems and Methods for Surface Modeling using Polarization Enhanced Imaging;" U.S. patent application Ser. No. 17/280,136, titled "Systems and Methods for Surface Normals Sensing with Polarization," U.S. patent application Ser. No. 17/277,242, titled "Systems and Methods for Augmentation of Sensor Systems and Imaging Systems with Polarization;" U.S. patent application Ser. No. 17/420,992, titled "Systems and Methods for Pose Detection and Measurement;" U.S. patent application Ser. No. 17/266,046, titled "Systems and Methods for Transparent Object Segmentation Using Polarization Cues;" U.S. patent application Ser. No. 17/314,929, titled "Systems and Methods for using Computer Vision to Pick up Small Objects;" and U.S. patent application Ser. No. 17/232,084, titled "Systems and Methods for Six-Degree of Freedom Pose Estimation of Deformable Objects" the entire disclosures of which are incorporated by reference herein.

As noted above, conventional camera systems also generally operate at a fixed frame rate, such as 30 frames per second. This constraint may limit or reduce the ability of such conventional camera systems to detect the timing of events with sub-frame precision.

Furthermore, the exposure settings of a digital camera, such as the aperture, exposure time, and gain (or ISO setting), are set based on the illumination conditions of the scene, such that the dynamic range of the light received by the image sensor of the camera corresponds to the dynamic range of the image sensor itself (e.g., minimizing the number underexposed pixels and minimizing the number of over-exposed pixels). This constraint may reduce the ability of such cameras to capture usable images under circumstances where the dynamic range of the scene exceeds the dynamic range of the camera (e.g., in manufacturing environments where illumination levels may vary greatly due, for example, to arc welding, shadows cast by manufacturing equipment moving through the, and the like).

The use of event cameras addresses some of these constraints. Event cameras, sometimes referred to as motion contrast cameras or dynamic vision sensors (DVS), generate events on a pixel level when a given pixel detects a change in illumination, rather than producing information based on the absolute brightness at a pixel. Each pixel of event camera operates independently and asynchronously. In particular, the pixels of an event camera do not generate data (events) when imaging a scene that is static and unchanging. However, when a given pixel detects a change in the received light that exceeds a threshold value, the pixel generates an event, where the event is timestamped and may indicate the direction of the change in brightness at that pixel (e.g., brighter or darker) and, in some cases, may indicate the magnitude of that change. Examples of event camera designs, representation of event camera data, methods for processing events generated by event cameras, and the like are described, for example, in Gallego, G., Delbruck, T., Orchard, G. M., Bartolozzi, C., Taba, B., Censi, A., . . . & Scaramuzza, D. (2020). Event-based Vision: A Survey. *IEEE Transactions on Pattern Analysis and Machine Intelligence*, 1 and Posch, Christoph, et al. "Retinomorphic event-based vision sensors: bioinspired cameras with spiking output." *Proceedings of the IEEE* 102.10 (2014): 1470-1484. Event cameras are capable of detecting events with very fine temporal precision (e.g., on the order of microseconds) and under high dynamic range conditions (e.g., because only changes in detected brightness are reported, rather than absolute brightness). Using event cameras for computer vision tasks in accordance with embodiments of the present disclosure enables the high speed, low latency detection of changes in the scene (e.g., due to illumination or motion) and enables computer vision systems to operate in a higher dynamic range of ambient illumination levels because the pixels of the event camera measure and report on only changes in brightness rather, than the absolute brightness or intensity across all of the pixels. In addition, embodiments of the present disclosure use event cameras to capture the angle of linear polarization (AOLP) of light received from a scene in comparatively compact and simple physical apparatus, as described in more detail below.

Aspects of embodiments of the present disclosure relate to an imaging system that includes an event camera and a rotating polarizing filter or rotatable polarizer placed in the optical path of the event camera, such that the event camera receives light filtered by a polarizer having an axis of polarization $\varphi_{pol}$ that changes over time.

FIG. 1A is a block diagram of a system including an event camera 20 with a rotatable linear polarizer 6 (or a "polarization event camera" 1 to refer to the combination of the event camera 20 with the rotatable linear polarizer 6) according to one embodiment of the present disclosure. The particular example shown in FIG. 1A includes a light source 10 configured to illuminate a scene 2 over a field of illumination 10A, but embodiments of the present disclosure are not limited thereto. For example, while FIG. 1A shows a single light source 10, in practice, most environments include multiple light sources, such as overhead lighting, spot lighting, and natural lighting through windows in indoor environments, and sunlight and artificial lighting in outdoor environments. In addition, polarization event cameras according to various embodiments are capable of operating without specialized or dedicated illumination sources (e.g., embodiments of the present disclosure are able to function using ambient light available in a scene through various light sources in the environment). The event camera 20 has a field of view 20A that images objects in a scene 2, and the field of view may be centered around an optical axis 20B of the event camera. The rotatable linear polarizer 6 may be located along the optical axis 20B of the event camera 20 such that all light received by the event camera 20 passes through the rotatable linear polarizer 6. Rotating the rotatable linear polarizer 6 about the optical axis 20B to different angles $\varphi_{pol}$ causes incoming light (from the field of view 20A of the event camera 20) having different angles of linear polarization $\varphi$ to be transmitted or blocked based on the alignment of the linear polarization $\varphi$ with the angle of the polarization axis $\varphi_{pol}$ of the rotatable linear polarizer 6.

Figure 1B:
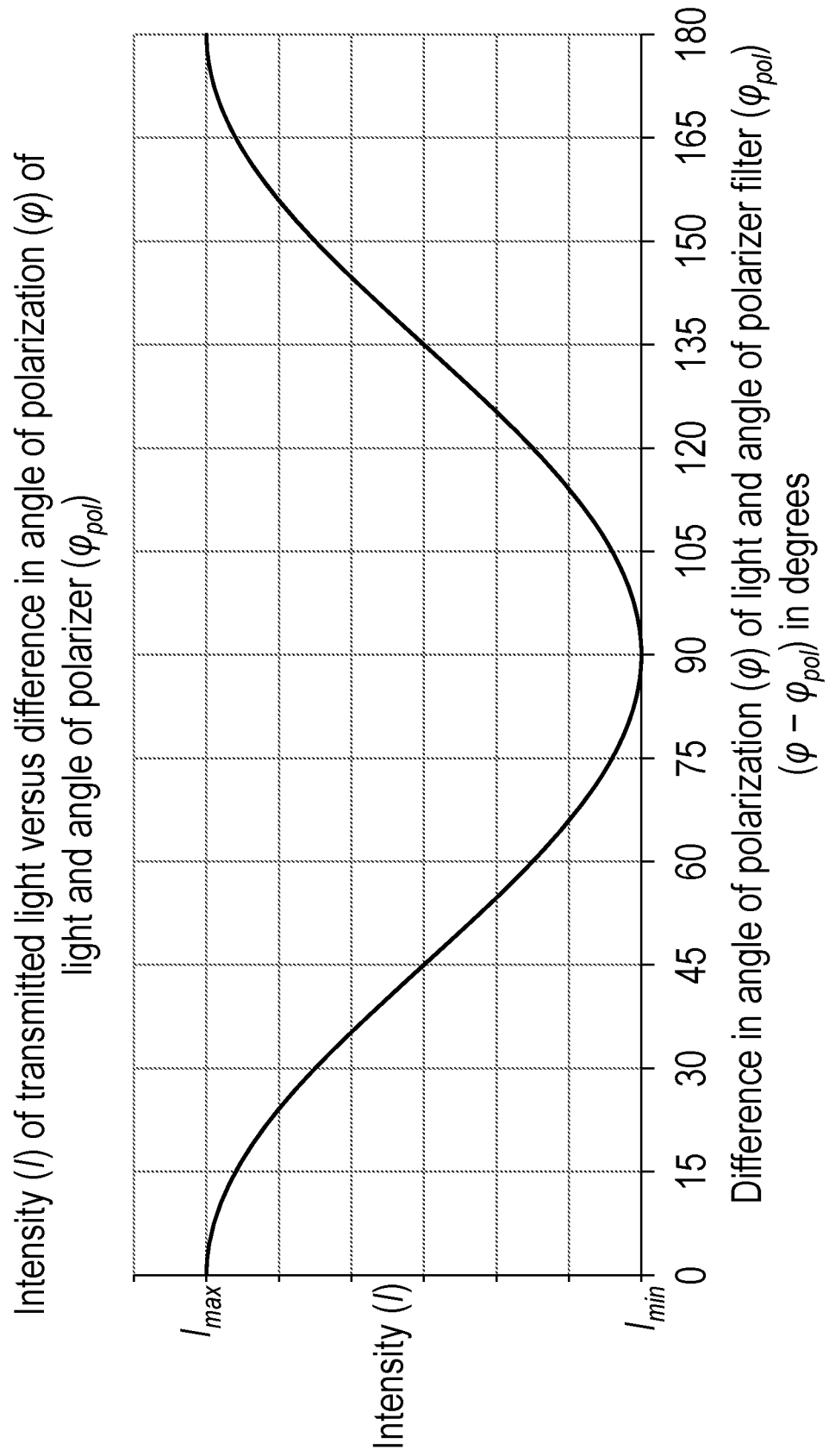
FIG. 1B is a graph depicting intensity of light transmitted through a linear polarizer filter as a function of the angle of the polarizer filter.

FIG. 1B is a graph depicting intensity of light transmitted through a linear polarizer filter as a function of the angle of the polarizer filter. In more detail, the intensity I of light passing through a polarizing filter can be expressed as:

$$I = \frac{(I_{max} + I_{min})}{2} + \frac{(I_{max} - I_{min})}{2}\cos(2(\varphi - \varphi_{pol})) \quad (1)$$

where $\varphi$ is the polarized component angle of polarization of the received light, $\varphi_{pol}$ is the angle of the polarizer, $I_{max}$ and $I_{min}$ are maximum and minimum value of the intensity depending on the polarizer angle (e.g., when aligned at $\varphi-\varphi_{pol}=0°$ versus when orthogonal at $|\varphi-\varphi_{pol}|=90°$, respectively) where the values of $I_{max}$ and $I_{min}$ may depend on the extinction ratio and other optical characteristics of the rotatable linear polarizer 6.

Figure 1C:
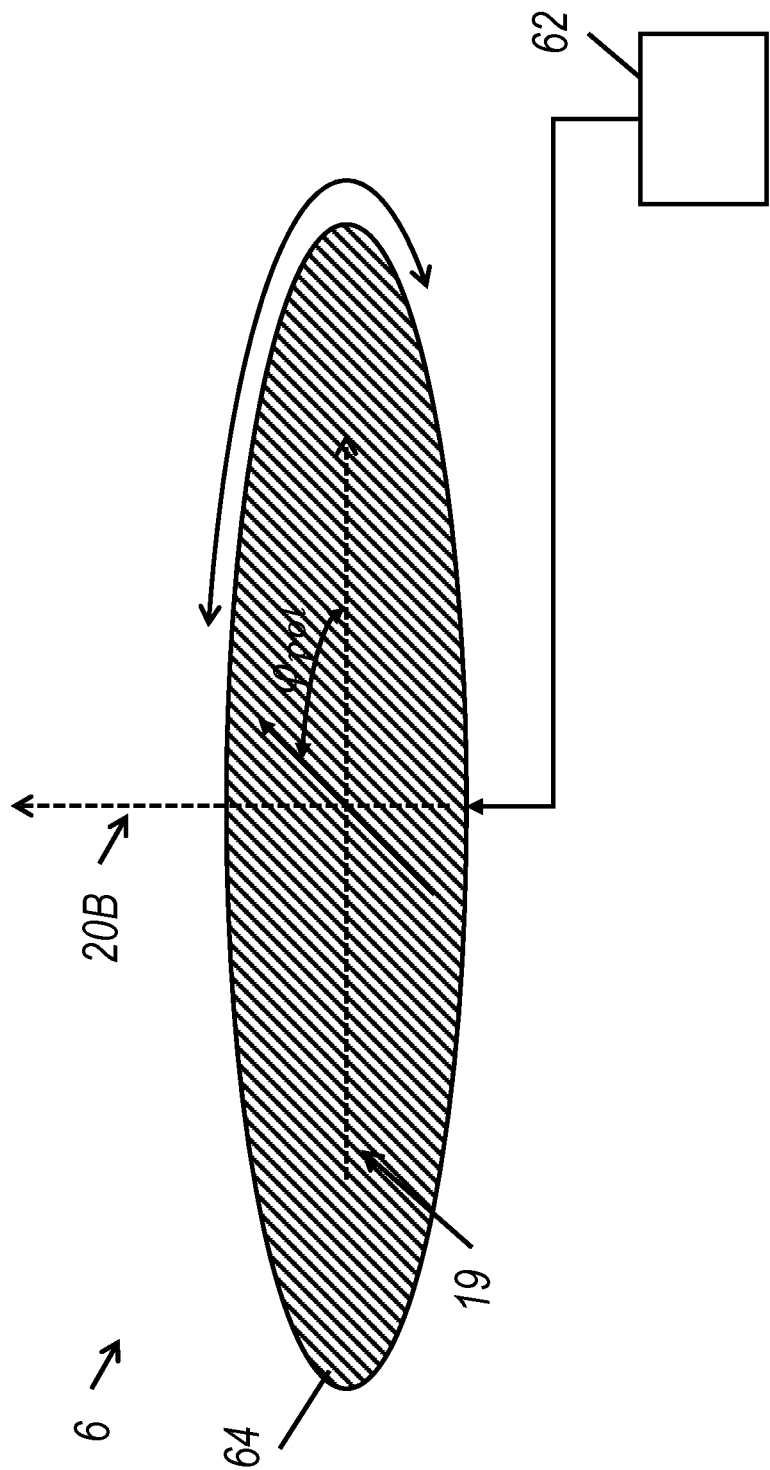
FIG. 1C is a schematic diagram depicting a rotatable linear polarizer implemented as an electronically controlled mechanically rotatable linear polarizer according to some embodiments of the present disclosure.

The rotatable linear polarizer 6 may be electronically rotated to change its polarization axis relative to the image sensor 22 of the event camera 20. FIG. 1C is a schematic diagram depicting a rotatable linear polarizer implemented as an electronically controlled mechanically rotatable linear polarizer according to some embodiments of the present disclosure. In some embodiments, the rotatable linear polarizer 6 is a linear polarizer that is an electronically-controlled, mechanically rotatable linear polarizer that includes an electrical motor 62 configured to mechanically rotate a fixed linear polarizer 64 (e.g., about the optical axis 20B of the event camera 20) to adjust or change the angle $\varphi_{pol}$ of linear polarization of the linear polarizer (the polarization axis) relative to the event camera 20 (e.g., a zero direction 19 oriented with respect to the event camera 20). For example, the electric motor 62 may include permanent magnet DC motors connected to a gear train meshed with teeth on an edge of the edge of the linear polarizer 64. As another example, the electric motor may include a piezoelectric ring motor (e.g., a piezoelectric revolving resonator and ultrasonic motor, see, e.g., U.S. Pat. Nos. 4,868,446 and 5,008,581). As such, an electronically controlled mechanically rotatable linear polarizer may be used to implement a rotatable linear polarizer 6 configured to control the angle of linear polarization of light received by the event camera 20 in a polarization event camera system 1 according to some embodiments of the present disclosure.

Figure 1E:
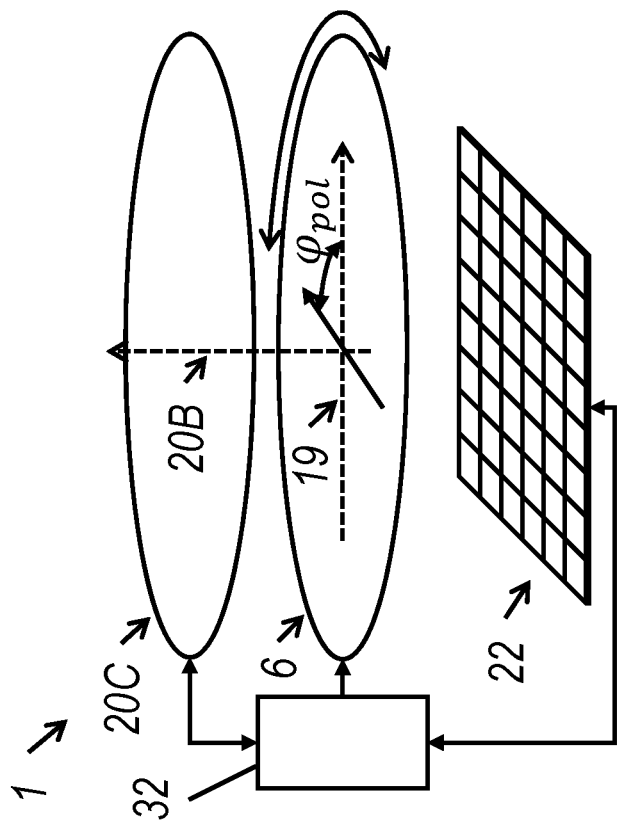
FIG. 1E is a schematic diagram depicting an imaging system having a rotatable linear polarizer behind the imaging optics of an event camera according to some embodiments of the present disclosure.
Figure 1D:
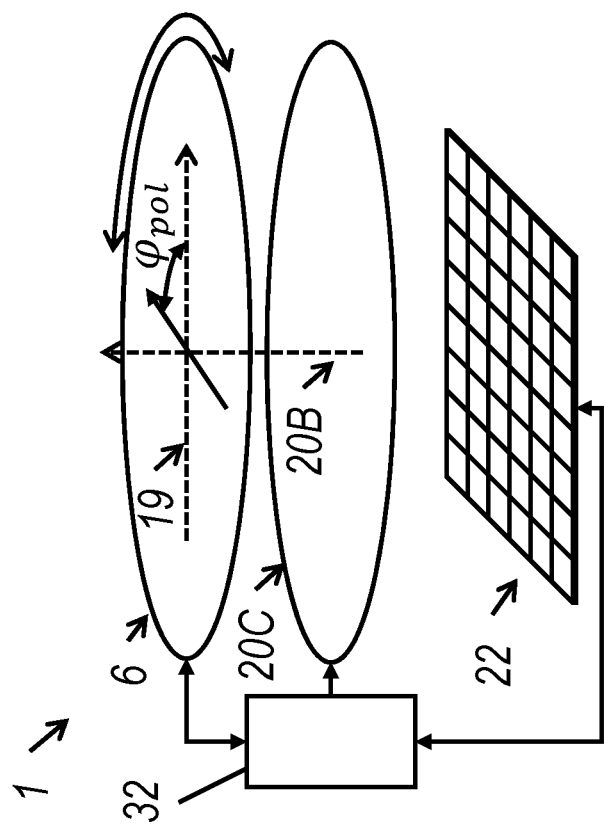
FIG. 1D is a schematic diagram depicting an imaging system having a rotatable linear polarizer in front of the imaging optics of an event camera according to some embodiments of the present disclosure.

FIG. 1D is a schematic diagram depicting an imaging system having a rotatable linear polarizer 6 in front of the imaging optics 20C of an event camera 20 according to some embodiments of the present disclosure. In the arrangement shown in FIG. 1D, the rotatable linear polarizer 6 is located along the optical axis 20B of the event camera 20 and placed in front of the imaging optics 20C (e.g., a refractive lens) of the event camera 20 (e.g., where the imaging optics 20C are between the rotatable linear polarizer 6 and the image sensor 22). This is similar to the arrangement shown in FIG. 1, where the rotatable linear polarizer 6 is shown as being outside of the event camera 20 and also includes embodiments where the rotatable linear polarizer 6 is integrated with the optical system of the event camera 20. As shown in FIG. 1D, the imaging optics 20C are configured to focus light onto an image sensor 22 of the event camera 20. In the embodiment shown in FIG. 1D, an event camera controller 32 of the event camera 20 (e.g. integrated into the event camera) is connected to the imaging optics 20C (e.g., to control the focus distance of the event camera 20), to control or monitor the rotation of the polarization axis of the rotatable linear polarizer 6, and to control and receive events from the image sensor 22.

FIG. 1E is a schematic diagram depicting an imaging system having a rotatable linear polarizer 6 behind the imaging optics 20C of an event camera 20 according to some embodiments of the present disclosure. FIG. 1E shows an arrangement substantially similar to that shown in FIG. 1D, except that the rotatable linear polarizer 6 is located behind the imaging optics 20C of the event camera 20 (e.g., between the imaging optics 20C and the image sensor 22).

While FIG. 1D and FIG. 1E respectively illustrate embodiments where the rotatable linear polarizer is located in front of or behind imaging optics 20C, embodiments of the present disclosure are not limited thereto, and the rotatable linear polarizer may be located at other portions of the optical path, such as between two different optical elements in the case where the imaging optics 20C form a compound lens.

A controller 30 (or controller system) is configured to receive image data (e.g., events) from the event camera 20, where the event camera 20 images the scene 2, such as by having a field of view 20A that encompasses the scene 2, where the scene 2 may include various objects. The controller 30 and/or the event camera 20 is configured to monitor and/or control the rotation of the rotatable linear polarizer 6, such that the angle of rotation of the polarization axis of the rotatable linear polarizer (as indicated by the arrow inside the polarizer in FIG. 1A) such that the change events generated the event camera 20 are correlated with the orientation or angle of the polarization axis of the rotatable linear polarizer 6 at the time of the event. In some embodiments, the light source 10 is configured to project structured light (e.g., various spatial patterns of light, such as vertical and/or horizontal stripes or bands in various widths and spacings) or unstructured light (e.g., standard, fill lighting or flood lighting, which may be uniform, or spot, or exhibit some falloff in intensity from the axis of the field of projection 10A).

Figure 2:
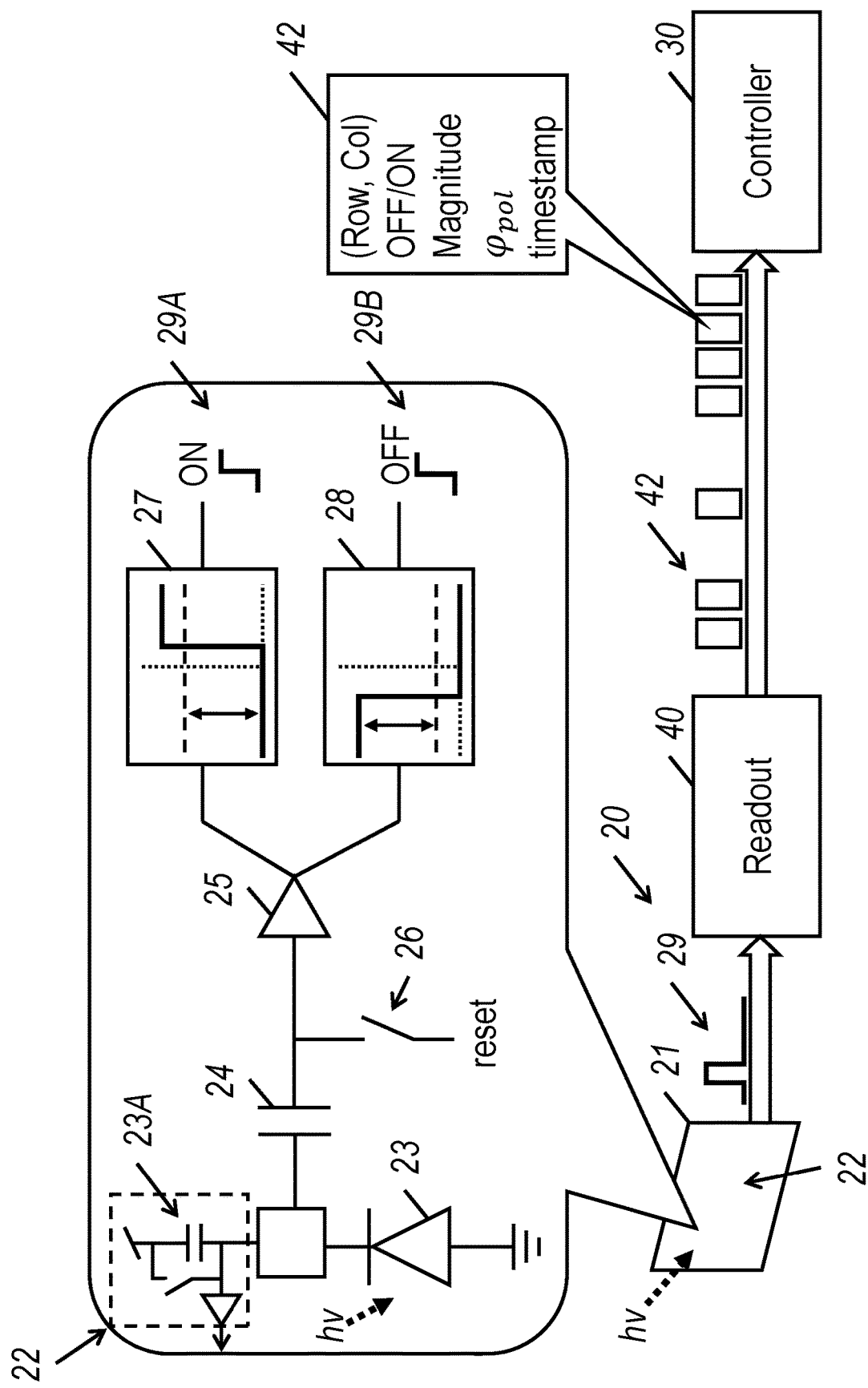
FIG. 2 is a schematic diagram of an event camera used with system according to some embodiments of the present disclosure.

FIG. 2 is a schematic diagram of an event camera used with system according to some embodiments of the present disclosure. While FIG. 2 depicts one example possible implementation, embodiments of the present disclosure are not limited thereto and other designs and architectures for event cameras, motion contrast cameras, dynamic vision sensors (DVS), and the like may be used. In the embodiment shown in FIG. 2, an event camera includes an image sensor 21 with an array of pixels 22 thereon. Each pixel 22 of the image sensor 21 includes a photodetector 23 (e.g., a photodiode) and a filter 24 (e.g., a capacitor) at the input of an amplifier 25. A reset switch 26 may be used to reset the capacitor, e.g., to reset the baseline illumination level of the pixel 22. A first comparator 27 is configured to generate a pixel-level ON event 29A in response to detecting an increase in detected intensity that exceeds a threshold value (indicated by the dashed line and the double headed arrow). Likewise, a second comparator 28 is configured to generate a pixel-level OFF event 29B in response to detecting a decrease in detected intensity that exceeds a threshold value (indicated by the dashed line and the double headed arrow). Each pixel generates pixel-level events 29 independently and asynchronously transmits the events to a readout circuit 40 of the event camera 20. Each pixel 22 may also include a standard, frame-based active pixel sensor (APS) 23A such that the event camera can also operate to capture full frames of images in a manner similar to a standard digital camera.

The readout circuit 40 is configured to generate camera-level change events 42 based on the pixel-level events 29 received from the individual pixels 22. In some embodiments, each camera-level change event 42 corresponds to a pixel-level event 29 and includes the row and column of the pixel that generated the event (e.g., the (x, y) coordinates of the pixel 22 within the image sensor 21), whether the pixel-level event 29 was an ON event 29A (e.g., increase in brightness) or an OFF event 29B (e.g., decrease in brightness), and a timestamp of the pixel-level event 29. In the particular embodiment shown in FIG. 2, each event also includes a magnitude of the change of brightness and the current angle $\varphi_{pol}$ of the polarization axis of the rotatable linear polarizer 6. The readout rates vary depending on the chip and the type of hardware interface, where current example implementations range from 2 MHz to 1,200 MHz. In some embodiments of event cameras, the camera-level change events are timestamped with microsecond resolution. In some embodiments, the readout circuit 40 is implemented using, for example, a digital circuit (e.g., a field programmable gate array, an application specific integrated circuit, or a microprocessor). The readout circuit 40 is shown in FIG. 2 as providing the generated camera-level change events 42 to a host or controller 30 over a communications link (e.g., a universal serial bus (USB) connection, an Ethernet connection, a wireless network connection such as Bluetooth or WiFi, or another appropriate communications link for communicating with a controller 30). In the same way that the individual pixels generate events asynchronously and independently, the readout circuit 40 may generate the camera-level events asynchronously (e.g., based on the timings of the pixel-level events 29), as indicated by the non-uniform spacing of camera-level change events 42, as shown in FIG. 2.

While the embodiment shown in FIG. 2 indicates that the camera-level change events 42 include a current angle $\varphi_{pol}$ of the rotatable linear polarizer 6 at the time of the event, embodiments of the present disclosure are not limited thereto. For example, in some embodiments, the camera-level change events 42 do not include the current angle $\varphi_{pol}$ of the polarization axis of the rotatable linear polarizer 6 and, instead, a value of $\varphi_{pol}$ at the time of the event may be determined by the controller 30, based on the timestamp of the camera-level change event 42 and based on the monitoring and/or control of the rotatable linear polarizer 6 by the controller 30.

In some embodiments of event cameras, the intensity measurements are made on a log scale and pixels 22 generate pixel-level events 29 based on log intensity change signals as opposed to linear intensity change signals. Such event cameras may be considered to have built-in invariance to scene illumination and may further provide event cameras with the ability to operate across a wide dynamic range of illumination conditions.

A comparative "standard" digital camera uses an image sensor based on charge-coupled device (CCD) or complementary metal oxide semiconductor (CMOS) active pixel sensor technologies captures images of a scene, where each image is represented as a two dimensional (2-D) grid or array of pixel values. The entire image sensor is exposed to light over a time interval, typically referred to as an exposure interval, and each pixel value represents the total amount of light (or an absolute amount of light) received at the pixel over that exposure interval (e.g., integrating the received light over time), where pixels generate signals representing the amount or intensity or brightness of light received over substantially the same exposure intervals. Each image captured by a digital camera may be referred to as an image frame, and a standard digital camera may capture many image frames one after another in sequence at an image frame rate that is limited by, for example, the exposure intervals of the individual frames, the sensitivity of the image sensor, the speed of the read-out electronics, and the like. Examples of typical image frame rates of standard digital cameras are 30 to 60 frames per second (fps), although some specialized digital cameras are capable of briefly capturing bursts of images at higher frame rates such as 1,000 frames per second.

Some of the limitations on the frame rates of digital cameras relate to the high bandwidth requirements of transferring full frames of data and exposing the pixels to a sufficient amount of light (e.g., a sufficient number of photons) to be within the operating dynamic range of the camera. Longer exposure intervals may be used to increase the number of photons, but come at the cost of decreased frame rates and motion blur in the case of imaging moving objects. Increased illumination, such as in the form of a flash or continuous lighting may also improve exposure, but such arrangements increase power requirements and such arrangements may not be available in many circumstances. Bandwidth requirements for transferring image data from the image sensor to memory and storing images for later analysis may be addressed by capturing images at lower resolutions (e.g., using lower resolution sensors, using only a portion of the image sensor, or decimating data from the image sensor), and/or by using larger amounts of expensive, high speed memory.

Figure 3:
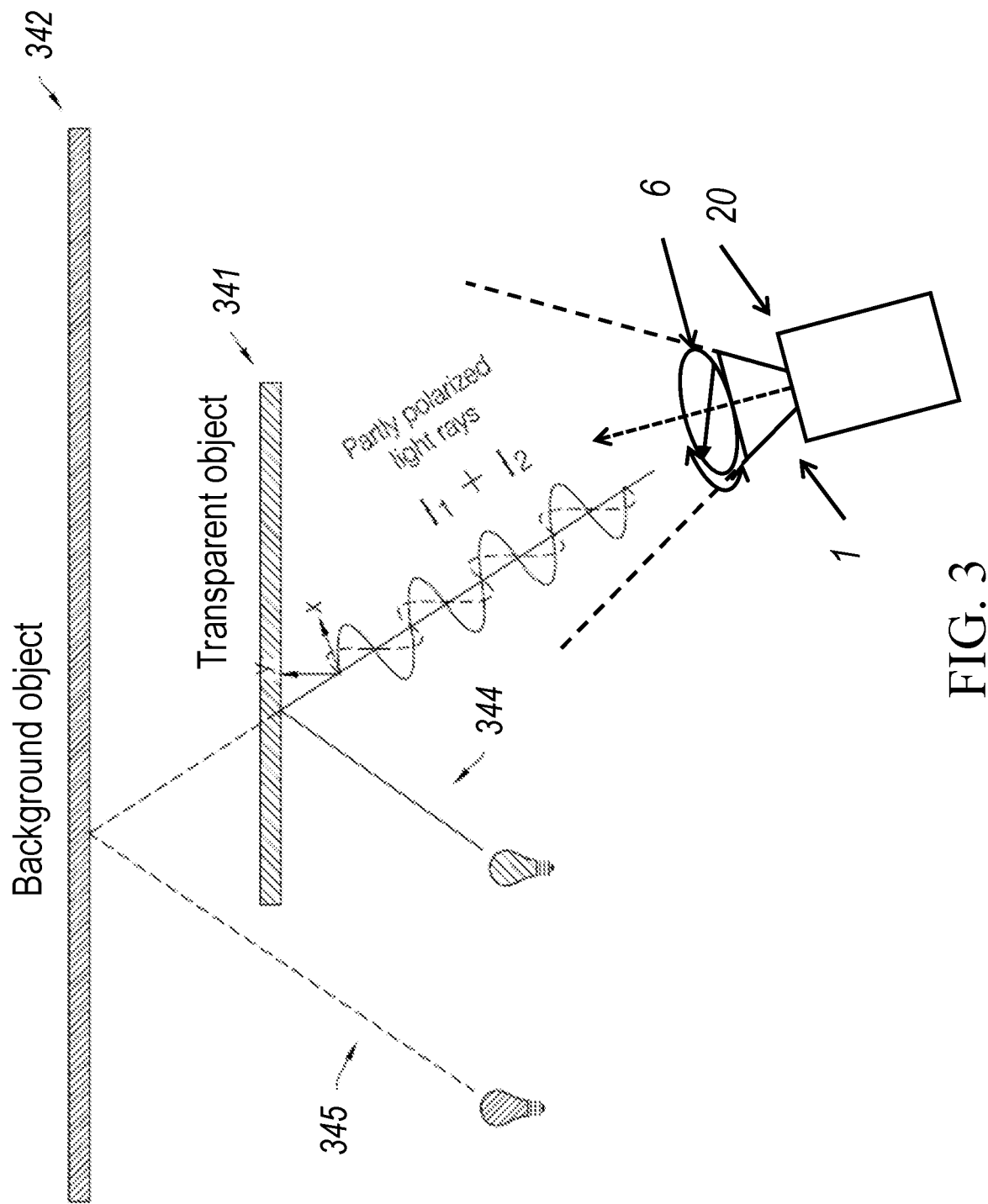
FIG. 3 is a high-level depiction of the interaction of light with transparent objects and non-transparent (e.g., diffuse and/or reflective) objects.

FIG. 3 is a high-level depiction of the interaction of light with transparent objects and non-transparent (e.g., diffuse and/or reflective) objects. As shown in FIG. 3, a polarization event camera system 1 captures polarization information of light received from a scene that includes a transparent object 341 in front of an opaque background object 342. A light ray 343 hitting the image sensor 22 of the polarization event camera system 1 contains polarization information from both the transparent object 341 and the background object 342. The small fraction of reflected light 344 from the transparent object 341 is heavily polarized, and thus has a large impact on the polarization measurement, in contrast to the light 345 reflected off the background object 342 and passing through the transparent object 341.

Similarly, a light ray hitting the surface of an object may interact with the shape of the surface in various ways. For example, a surface with a glossy paint may behave substantially similarly to a transparent object in front of an opaque object as shown in FIG. 3, where interactions between the light ray and a transparent or translucent layer (or clear coat layer) of the glossy paint causes the light reflecting off of the surface to be polarized based on the characteristics of the transparent or translucent layer (e.g., based on the thickness and surface normals of the layer), which are encoded in the light ray hitting the image sensor. Similarly, as discussed in more detail below with respect to shape from polarization (SfP) theory, variations in the shape of the surface (e.g., direction of the surface normals) may cause significant changes in the polarization of light reflected by the surface of the object. For example, smooth surfaces may generally exhibit the same polarization characteristics throughout, but a scratch or a dent in the surface changes the direction of the surface normals in those areas, and light hitting scratches or dents may be polarized, attenuated, or reflected in ways different than in other portions of the surface of the object. Models of the interactions between light and matter generally consider three fundamentals: geometry, lighting, and material. Geometry is based on the shape of the material. Lighting includes the direction and color of the lighting. Material can be parameterized by the refractive index or angular reflection/transmission of light. This angular reflection is known as a bi-directional reflectance distribution function (BRDF), although other functional forms may more accurately represent certain scenarios. For example, the bidirectional subsurface scattering distribution function (BSSRDF) would be more accurate in the context of materials that exhibit subsurface scattering (e.g. marble or wax).

A light ray 343 hitting the image sensor 22 of a polarization event camera system 1 has three measurable components: the intensity of light (intensity image/I), the percentage or proportion of light that is linearly polarized (degree of linear polarization/DOLP/$\rho$), and the direction of that linear polarization (angle of linear polarization/AOLP/$\varphi$). These properties encode information about the surface curvature and material of the object being imaged, which can be used by a computer vision system (e.g., implemented as a part of the controller 30) to detect transparent objects or other optically challenging objects, in addition to other types of objects that exhibit more diffuse material characteristics. In some embodiments, by using one or more polarization cameras, a pose estimator of a computer vision system can detect other optically challenging objects based on similar polarization properties of light passing through translucent objects and/or light interacting with multipath inducing objects or by non-reflective objects (e.g., matte black objects).

Some techniques for determining the angle of linear polarization of light received from a scene use multiple camera modules with polarizers set at different angles or by using a conventional camera with a polarization mask.

Figure 4:
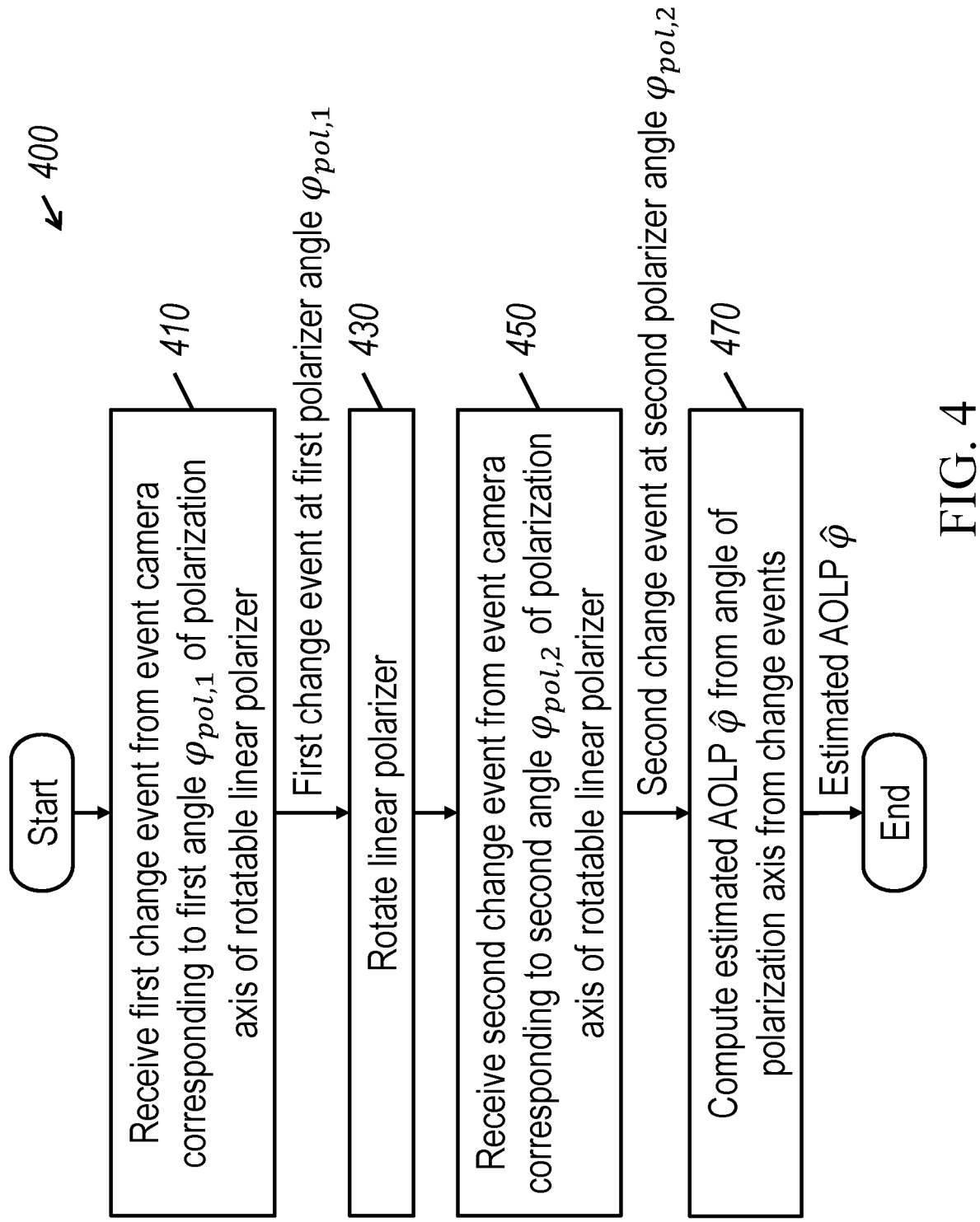
FIG. 4 is a flowchart of a method for computing angle of linear polarization of light based on events from an event camera with a rotatable linear polarizer according to one embodiment of the present disclosure.

FIG. 4 is a flowchart of a method 400 for computing or estimating an angle of linear polarization $\varphi$ of light received at an event camera based on events received from the event camera with a rotatable linear polarizer according to one embodiment of the present disclosure. The method of FIG. 4 is described herein as being performed by a controller 30 connected to an event camera 20 as described above, and may be implemented using instructions executed by a processing circuit (e.g., a processor and memory storing instructions) of the controller 30. In various embodiments, the processing circuit may be implemented by a microprocessor or microcontroller and associated memory, a field programmable gate array (FPGA), a graphics processing unit (GPU), an application specific integrated circuit (ASIC) and/or combinations thereof. In various embodiments, the processing circuit may include multiple processing circuits operating in parallel (e.g., performing the same operations on different data), in series (e.g., performing different portions of a computational pipeline), or combinations thereof (e.g., including a first plurality of processing circuits performing a first part of the computational pipeline in parallel and a second plurality of processing circuits performing a second part of the computational pipeline in parallel). While the method of FIG. 4 is described herein as being performed by the controller 30, in some embodiments the method may be performed by other processing circuits, such as a processing circuit of the readout circuit 40 of the event camera 20, where the events generated by the readout circuit 40 may further include estimates of the AOLP $\varphi$ of the light as part of the change events 42 generated by the event camera 20.

Referring back to FIG. 4, in operation 410, the controller 30 receives a first change event from the event camera 20 corresponding to a first angle $\varphi_{pol,1}$ of polarization axis of rotatable linear polarizer 6 (e.g., where the change event was detected while the rotatable linear polarizer 6 was oriented at a first angle $\varphi_{pol,1}$). In operation 430, the linear polarizer rotates (e.g., under the control of the controller 30 or autonomously while the angle is monitored by the controller 30 and/or the readout circuit 40). In operation 450, the controller 30 receives a second change event from the event camera 20 corresponding to a second angle $\varphi_{pol,2}$ of polarization axis of rotatable linear polarizer 6. For the sake of discussion herein, it is assumed that the first change event and the second change event were generated by the same pixel of the event camera 20.

In operation 470, the controller 30 computes an estimate $\hat{\varphi}$ of the angle of linear polarization $\varphi$ of the light received by the pixel of the event camera 20 that generated the first change event and the second change event.

In more detail, some embodiments relate to computing the estimate $\hat{\varphi}$ of the angle of linear polarization $\varphi$ of the light based on detecting an alignment between the angle of linear polarization $\varphi$ and the angle $\varphi_{pol}$ of the polarization axis of the rotatable linear polarizer 6. As the rotatable linear polarizer 6 is rotated (e.g., referring to operation 430), the angle of the polarization axis $\varphi_{pol}$ changes, and the change of intensity dI measured by any given pixel of the event camera 20 can be defined as follows:

$$\frac{dI}{d\varphi_{pol}} = (I_{max}-I_{min})\sin(2(\varphi-\varphi_{pol}))d\varphi_{pol} = \rho I \sin(2(\varphi-\varphi_{pol})) \quad (2)$$

where $\rho$ is the degree of linear polarization of the incoming light, I is the light intensity of the incoming light, $\varphi$ is the angle of linear polarization of the incoming light, $\varphi_{pol}$ is the angle of the polarization axis of the rotatable linear polarizer, and $d\varphi_{pol}$ is the change of the angle of the rotatable linear polarizer (assuming that change is small, e.g., <<1, within the temporal resolution of the event camera 20). This assumes that the scene remains substantially static during the course of changing the angle $\varphi_{pol}$ of the axis of the rotatable linear polarizer 6 over some small angle $d\varphi_{pol}$, which may generally hold when the rotation speed of the rotatable linear polarizer 6 is sufficiently high and because event cameras in accordance with embodiments of the present disclosure have sufficiently low latency response times (as noted above, on the order of microseconds). Based on Equation 2, above, there are two unknown values: the angle of linear polarization $\varphi$ and the degree of linear polarization $\rho$ of the incoming light. Accordingly, a system of linear equations can be formed by making two measurements corresponding to two different angles of the polarization axis of the rotatable linear polarizer (e.g., $\varphi_{pol,1}$ and $\varphi_{pol,2}$) and their corresponding changes in angle (e.g., $d\varphi_{pol,1}$ and $d\varphi_{pol,2}$). Solving this system of equations thereby produces computed estimates of the angle of linear polarization $\varphi$ and the product of the degree of linear polarization and the intensity ($\rho$I) of the incoming light.

As such, in embodiments where the camera-level change events 42 generated by the event camera 20 include a magnitude of the change of brightness detected at a particular pixel, the magnitude of the change in brightness, along with the direction of the change in brightness (brighter versus darker or ON versus OFF), directly represents an estimate of dI at the pixel corresponding to the camera-level change event 42.

The value of dI is 0 when $\varphi=\varphi_{pol}$ (that is, when $\varphi-\varphi_{pol}=0$), as shown in FIG. 1B (e.g., the slope of the curve is 0 at $\varphi-\varphi_{pol}=0$). Therefore, in some embodiments, the controller detects an alignment of the axis of polarization of the rotatable linear polarizer 6 with the angle of linear polarization of the light received at a given pixel by detecting the angle $\varphi_{pol}$ of the rotatable polarizer 6 at which the magnitude of the change signal reported in the camera-level change events 42 received from the event camera 20 is the lowest or smallest at the given pixel. This is based on an assumption that the changes in the intensity of light detected by the event camera 20 that were caused solely (or primarily) by the rotation of the rotatable linear polarizer 6. In other words, it is assumed that the scene imaged by the polarization event camera system 1, along with the angle of polarization $\varphi$ of the light from the scene, is substantially static over the course of rotating the angle $\varphi_{pol}$ of the polarization axis of the rotatable linear polarizer 6 (e.g., as it rotates through 180°) and over the course of collecting the camera-level change events 42 that were generated by changes in the intensity of received light.

Considering FIG. 1B, the value of dI is also 0 when the transmission is minimum, that is, when the rotatable linear polarizer is oriented with its axis perpendicular to the angle of linear polarization of the incoming light (($\varphi-\varphi_{pol}=90°$). In some embodiments, the controller 30 distinguishes between the aligned case ($\varphi-\varphi_{pol}=0°$) and the orthogonal case ($\varphi-\varphi_{pol}=90°$) based on the direction of change of the events before and/or after the detection of an angle of the polarizer $\varphi_{pol}$ where dI=0. In particular, the aligned case ($\varphi-\varphi_{pol}=0°$) corresponds to a case where the event before the time where dI=0 has a positive slope (e.g., an increase in brightness) and the event after the time where dI=0 has a negative slope (e.g., a decrease in brightness).

This may be distinguished from the orthogonal case ($\varphi-\varphi_{pol}=90°$), where the event before the time where dI=0 has a negative slope (e.g., decrease in brightness) and the event after the time where dI=0 has a positive slope (e.g., an increase in brightness).

In some embodiments, the controller 30 detects the point at which $\varphi=\varphi_{pol}$ by detecting two consecutive events at a same pixel, including a first camera-level change event where the sign or direction of the change is positive (e.g., increasing brightness) and a second camera-level change event immediately following the first camera-level change event where the sign or direction of the second event is negative (e.g., decreasing brightness), where the detected angle of linear polarization $\varphi$ at the pixel corresponding to the events is between the angles of the rotatable linear polarizer associated with the first camera-level change event and the second camera-level change event.

More precisely, the first camera-level change event for a pixel may indicate a positive change in brightness or detected intensity with magnitude $A_1$ and a first associated angle $\varphi_{pol,1}$ of the polarization axis of the rotatable linear polarizer 6 and the second camera-level change event for the same pixel as the first camera-level change event, immediately after the first camera-level change event, indicates a negative change in brightness or detected intensity with magnitude $A_2$ and a second associated angle $\varphi_{pol,2}$ of the polarization axis of the rotatable linear polarizer 6. In some embodiments, the first camera-level change event and the second camera-level change event are considered to be consecutive when: the first camera-level change event has a first timestamp and the second camera-level change event has a second timestamp, the second timestamp being later than the first timestamp, and there is no camera-level change event corresponding to the same pixel as the first and second camera-level change events with timestamps falling between the first timestamp and the second timestamp.

In some embodiments, the computed or estimated angle of linear polarization is interpolated between $\varphi_{pol,1}$ and $\varphi_{pol,2}$, where the interpolation may be performed based on the magnitudes $A_1$ and $A_2$ of the changes in brightness associated with the two camera-level events. For example, in some embodiments, linear interpolation may be performed to compute an estimated AOLP $\hat{\varphi}$ of the actual AOLP $\varphi$ of the light received at the pixel in accordance with:

$$\hat{\varphi} = \varphi_{pol,1} + (\varphi_{pol,2} - \varphi_{pol,1})\left(\frac{A_1}{A_1 + A_2}\right) \quad (3)$$

In other embodiments of the present disclosure, other interpolation methods may be used, such as quadratic interpolation or trigonometric interpolation (e.g., based on Equation 1).

In some embodiments, the controller 30 estimates the angle of linear polarization $\hat{\varphi}$ in operation 470 of FIG. 4 by solving a set of linear equations based on events captured when $\varphi_{pol}$ differs by an arbitrary angle (other than a multiple of 180°). For example, referring back to Equation (2), the measured change in intensity dI is equal to $\rho I \sin(2(\varphi-\varphi_{pol}))d\varphi_{pol}$. Therefore, for two different measurements $dI_1$ and $dI_2$ at two different angles of the polarization axis of the rotatable linear polarizer $\varphi_{pol,1}$ and $\varphi_{pol,2}$ and their corresponding changes in angle $d\varphi_{pol,1}$ and $d\varphi_{pol,2}$, a system of equations can be formed:

$$dI_1 = \rho I \sin(2(\varphi - \varphi_{pol,1}))d\varphi_{pol,1}$$

$$dI_2 = \rho I \sin(2(\varphi - \varphi_{pol,2}))d\varphi_{pol,2} \quad (4)$$

Because there are two unknowns (degree of linear polarization $\rho$ and angle of linear polarization $\varphi$), and two equations, in some embodiments, the controller 30 solves this system of equations to compute the degree of linear polarization $\rho$ and angle of linear polarization $\varphi$ of the incoming light.

In some embodiments, the controller 30 estimates the angle of linear polarization $\hat{\varphi}$ in operation 470 of FIG. 4 by solving a set of linear equations based on events captured when $\varphi_{pol}$ differs by the particular angle of 45°. As one example, events are captured when $\varphi_{pol}$ is equal to 0° and 45° (assuming a fixed rotation speed of the rotatable linear polarizer 6):

$$dI_0 = \rho I \sin(2\varphi) \quad (5)$$

$$dI_{45} = \rho I \cos(2\varphi) \quad (6)$$

where $dI_0$ is the magnitude and sign of the camera-level change event 42 of the event camera output when $\varphi_{pol}$ is at 0° (e.g., which correspond to the first change event received at operation 410 in FIG. 4) and $dI_{45}$ is the magnitude and sign of the camera-level change event 42 of the event camera output when $\varphi_{pol}$ is at 45° (e.g., which correspond to the first change event received at operation 450 in FIG. 4). Therefore, in these embodiments:

$$\hat{\varphi} = \frac{1}{2}\arctan\left(\frac{dI_0}{dI_{45}}\right) \quad (7)$$

Because an event camera 20 typically has microsecond-level temporal resolution, the real time angle of polarization data capture can be reached with a rapidly spinning rotatable linear polarizer 6 in front of the event camera 20. For example, with just 10 rotations per second (600 revolutions per minute or RPM) the estimated polarization angle $\hat{\varphi}$ can be calculated 80 times per second. Every 45 degrees range allows a new polarization angle calculation, giving 8 separate measurements per single rotation.

Therefore, aspects of embodiments of the present disclosure relate to systems and methods for robust reconstruction of the angle of linear polarization of light received from a scene, even in cases where the scenes exhibit high dynamic range or in which comparative, standard digital camera systems may exhibit significant overexposure, e.g. in the presence of sunlight or bright conditions such as arc welding in a manufacturing facility. With a sufficiently rapidly spinning rotatable linear polarizer, real-time capture and estimation of the angle of linear polarization is possible.

As some examples, the angle of linear polarization of light received over the image sensor of the event camera 20 (e.g., based on camera-level events received over a particular time window corresponding to an image frame) may be used to generate an angle of linear polarization (AOLP) image map representing the estimated angle of linear polarization $\varphi$ detected at each pixel of the image sensor 22 of the event camera 20.

Such an AOLP image map may be supplied as an input for further processing in a computer vision system, such as being supplied as input to an instance segmentation network trained to compute a segmentation map of a scene (e.g., labeling individual instances of objects in the scene with the classifications of those objects). For example, in a manufacturing environment, such a segmentation map may identify which portions of the image depict different types of objects such as workpieces, components attached to the workpieces, robot arms and end effectors, humans, and the like. In an autonomous driving environment, such a segmentation map may identify portions of the scene that depict different types of objects such as pedestrians, cyclists, motor vehicles, trees, traffic lights, potholes, oil slicks, road surface ice, and the like.

As noted above some examples of techniques for performing instance segmentation and other computer vision tasks making use of information regarding the angle of linear polarization of light received by a camera are described in, for example: U.S. patent application Ser. No. 17/266,054, titled "Systems and Methods for Surface Modeling using Polarization Enhanced Imaging;" U.S. patent application Ser. No. 17/280,136, titled "Systems and Methods for Surface Normals Sensing with Polarization," U.S. patent application Ser. No. 17/277,242, titled "Systems and Methods for Augmentation of Sensor Systems and Imaging Systems with Polarization;" U.S. patent application Ser. No. 17/420,992, titled "Systems and Methods for Pose Detection and Measurement;" U.S. patent application Ser. No. 17/266,046, titled "Systems and Methods for Transparent Object Segmentation Using Polarization Cues;" U.S. patent application Ser. No. 17/314,929, titled "Systems and Methods for using Computer Vision to Pick up Small Objects;" and U.S. patent application Ser. No. 17/232,084, titled "Systems and Methods for Six-Degree of Freedom Pose Estimation of Deformable Objects"

As another example, Shape from Polarization (SfP) theory (see, e.g., Gary A Atkinson and Edwin R Hancock. Recovery of surface orientation from diffuse polarization. IEEE transactions on image processing, 15(6):1653-1664, 2006.) states that the relationship between the refractive index (n), azimuth angle ($\theta_a$) and zenith angle ($\theta_z$) of the surface normal of an object and the $\varphi$ and $\rho$ components of the light ray coming from that object follow the following characteristics when diffuse reflection is dominant:

$$\rho = \frac{\left(n - \frac{1}{n}\right)^2 \sin^2(\theta_z)}{2 + 2n^2 - \left(n + \frac{1}{n}\right)^2 \sin^2\theta_z + 4\cos\theta_z\sqrt{n^2 - \sin^2\theta_z}} \quad (8)$$

$$\varphi = \theta_a \quad (9)$$

and when the specular reflection is dominant:

$$\rho = \frac{2\sin^2\theta_z \cos\theta_z \sqrt{n^2 - \sin^2\theta_z}}{n^2 - \sin^2\theta_z - n^2\sin^2\theta_z + 2\sin^4\theta_z} \quad (10)$$

$$\varphi = \theta_a - \frac{\pi}{2} \quad (11)$$

Note that in both cases $\rho$ increases exponentially as $\theta_z$ increases and if the refractive index is the same, specular reflection is much more polarized than diffuse reflection.

Accordingly, the AOLP image map captured by a polarized event camera is used, in some embodiments, as an input for performing 3-D shape reconstruction of an object in accordance with shape from polarization techniques.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A polarized event camera system comprising:
an event camera having a field of view centered around an optical axis, the event camera comprising an image sensor comprising a plurality of pixels, each pixel of the event camera operating independently and asynchronously and being configured to generate change events based on changes in intensity of light received by the pixel;
a rotatable linear polarizer aligned with the optical axis of the event camera, the rotatable linear polarizer having a polarization axis, the polarization axis of the rotatable linear polarizer being rotatable about the optical axis of the event camera;
a controller comprising a processing circuit and a memory, the memory storing instructions that, when executed by the processing circuit, cause the processing circuit to perform operations comprising:
receiving a first change event from the event camera, the first change event representing a first detected change in intensity of light received at a pixel of the event camera, and the first change event corresponding to the polarization axis of the rotatable linear polarizer being at a first angle;
receiving a second change event from the event camera, the second change event representing a second detected change in the intensity of the light received at the pixel of the event camera, and the second change event corresponding to the polarization axis of the rotatable linear polarizer being at a second angle different from the first angle; and
estimating an angle of linear polarization of the light received at the pixel of the event camera based on the first change event and the second change event.

2. The polarized event camera system of claim 1, wherein the estimate of the angle of linear polarization of the light received at the pixel of the event camera is computed based on:
detecting an angle of the polarization axis of the rotatable linear polarizer at which a magnitude of a change in the intensity of the light received at the pixel of the event camera is at a minimum.

3. The polarized event camera system of claim 2, wherein the first change event comprises a first timestamp and the second change event comprises a second timestamp, the second timestamp being later than the first timestamp, and
wherein the minimum of the change in the intensity of the light received at the pixel of the event camera is computed by:
determining that the first change event identifies an increase in the intensity of the light received at the pixel and that the second change event identifies a decrease in the intensity of the light received at the pixel; and
estimating the angle of linear polarization of the light as an angle between the first angle of the polarization axis of the rotatable linear polarizer and the second angle of the polarization axis of the rotatable linear polarizer.

4. The polarized event camera system of claim 3, wherein the angle between the first angle of the polarization axis of the rotatable linear polarizer and the second angle of the polarization axis of the rotatable linear polarizer is estimated by linearly interpolating the first angle and the second angle in accordance with a magnitude of the first change event and a magnitude of the second change event.

5. The polarized event camera system of claim 1, wherein the first angle of the polarization axis of the rotatable linear polarizer and the second angle of the polarization axis of the rotatable linear polarizer differ by an angle other than a multiple of 180°, and
wherein the instructions to estimate the angle of linear polarization comprise instructions to compute an estimated angle of linear polarization $\hat{\varphi}$ in accordance with solving a system of equations:

$$dI_1 = \rho I \sin(2(\varphi - \varphi_{pol,1})) d\varphi_{pol,1}$$

$$dI_2 = \rho I \sin(2(\varphi - \varphi_{pol,2})) d\varphi_{pol,2}$$

for the angle of linear polarization $\varphi$, where $dI_1$ is the first detected change in intensity of light, $dI_2$ is the second detected change in intensity of light, $\varphi_{pol,1}$ is the first angle of the polarization axis of the rotatable linear polarizer corresponding to the first change event, and $\varphi_{pol,2}$ is the second angle of the polarization axis of the rotatable linear polarizer corresponding to the second change event.

6. The polarized event camera system of claim 1, wherein the first angle of the polarization axis of the rotatable linear polarizer and the second angle of the polarization axis of the rotatable linear polarizer differ by 45°, and
wherein the instructions to estimate the angle of linear polarization comprise instructions to compute an estimated angle of linear polarization $\hat{\varphi}$ in accordance with:

$$\hat{\varphi} = \frac{1}{2} \arctan\left(\frac{I_0}{I_{45}}\right)$$

where $I_0$ is a magnitude of the first change event at the first angle of the polarization axis of the rotatable linear polarizer and $I_{45}$ is a magnitude of the second change event at the second angle of the polarization axis of the rotatable linear polarizer.

7. The polarized event camera system of claim 1, wherein the memory further stores instructions that, when executed by the processing circuit, cause the processing circuit to compute an angle of linear polarization (AOLP) map representing an estimated angle of linear polarization detected at each pixel of the image sensor of the event camera.

8. The polarized event camera system of claim 1, wherein the rotatable linear polarizer comprises an electronically controlled mechanically rotatable linear polarizer.

9. A method for estimating a polarization state of light, the method comprising:
receiving a first change event from an event camera having a field of view centered around an optical axis, the event camera comprising an image sensor comprising a plurality of pixels, each pixel of the event camera operating independently and asynchronously and being configured to generate change events based on changes in intensity of light received by the pixel, the first change event representing a first detected change in intensity of light received at a pixel of the event camera, and the first change event corresponding to a polarization axis of a rotatable linear polarizer being at a first angle, the rotatable linear polarizer being aligned with the optical axis of the event camera and the rotatable linear polarizer having a polarization axis rotatable about the optical axis of the event camera;

receiving a second change event from the event camera, the second change event representing a second detected change in the intensity of the light received at the pixel of the event camera, and the second change event corresponding to the polarization axis of the rotatable linear polarizer being at a second angle different from the first angle; and estimating an angle of linear polarization of the light received at the pixel of the event camera based on the first change event and the second change event.

10. The method of claim 9, wherein the estimating the angle of linear polarization of the light received at the pixel of the event camera comprises:

detecting an angle of the polarization axis of the rotatable linear polarizer at which a magnitude of a change in the intensity of the light received at the pixel of the event camera is at a minimum.

11. The method of claim 10, wherein the first change event comprises a first timestamp and the second change event comprises a second timestamp, the second timestamp being later than the first timestamp, and wherein the minimum of the change in the intensity of the light received at the pixel of the event camera is computed by:

determining that the first change event identifies an increase in the intensity of the light received at the pixel and that the second change event identifies a decrease in the intensity of the light received at the pixel; and estimating the angle of linear polarization of the light as an angle between the first angle of the polarization axis of the rotatable linear polarizer and the second angle of the polarization axis of the rotatable linear polarizer.

12. The method of claim 11, wherein the angle between the first angle of the polarization axis of the rotatable linear polarizer and the second angle of the polarization axis of the rotatable linear polarizer is estimated by linearly interpolating the first angle and the second angle in accordance with a magnitude of the first change event and a magnitude of the second change event.

13. The method of claim 9, wherein the first angle of the polarization axis of the rotatable linear polarizer and the second angle of the polarization axis of the rotatable linear polarizer differ by an angle other than a multiple of 180°, and wherein the estimating the angle of linear polarization comprises computing an estimated angle of linear polarization $\hat{\varphi}$ in accordance with solving a system of equations:

$$dI_1 = \rho I \sin(2(\varphi - \varphi_{pol,1})) d\varphi_{pol,1}$$

$$dI_2 = \rho I \sin(2(\varphi - \varphi_{pol,2})) d\varphi_{pol,2}$$

for the angle of linear polarization $\varphi$, where $dI_1$ is the first detected change in intensity of light, $dI_2$ is the second detected change in intensity of light, $\varphi_{pol,1}$ is the first angle of the polarization axis of the rotatable linear polarizer corresponding to the first change event, and $\varphi_{pol,2}$ is the second angle of the polarization axis of the rotatable linear polarizer corresponding to the second change event.

14. The method of claim 9, wherein the first angle of the polarization axis of the rotatable linear polarizer and the second angle of the polarization axis of the rotatable linear polarizer differ by 45°, and wherein the estimating the angle of linear polarization comprises computing an estimated angle of linear polarization $\hat{\varphi}$ in accordance with:

$$\hat{\varphi} = \frac{1}{2} \arctan\left(\frac{I_0}{I_{45}}\right)$$

where $I_0$ is a magnitude of the first change event at the first angle of the polarization axis of the rotatable linear polarizer and $I_{45}$ is a magnitude of the second change event at the second angle of the polarization axis of the rotatable linear polarizer.

15. The method of claim 9, further comprising computing an angle of linear polarization (AOLP) map representing an estimated angle of linear polarization detected at each pixel of the image sensor of the event camera.

16. The method of claim 9, wherein the rotatable linear polarizer comprises an electronically controlled mechanically rotatable linear polarizer.

* * * * *